United States Patent [19]

Brooks et al.

[11] Patent Number: 5,049,532

[45] Date of Patent: * Sep. 17, 1991

[54] METHOD FOR SURFACE TREATING THIXOTROPIC AGENTS AND THE RESULTANT LOW MOISTURE THIXOTROPE

[75] Inventors: Lamar E. Brooks, 57 Temple Rd., Wellesley, Mass. 02181; Gerald L. Brooks, Wellesley, Mass.

[73] Assignee: Lamar E. Brooks, Wellesley, Mass.

[ * ] Notice: The portion of the term of this patent subsequent to Oct. 30, 2007 has been disclaimed.

[21] Appl. No.: 489,065

[22] Filed: Mar. 5, 1990

Related U.S. Application Data

[63] Continuation-in-part of Ser. No. 321,588, Mar. 10, 1989, Pat. No. 4,966,871.

[51] Int. Cl.$^5$ .............................................. C04B 33/30
[52] U.S. Cl. ...................................... 501/148; 501/150
[58] Field of Search ................................ 501/148, 150

[56] References Cited

U.S. PATENT DOCUMENTS

| 2,490,357 | 12/1949 | Hyde | 260/46.5 |
|---|---|---|---|
| 2,541,137 | 2/1951 | Warrick | 260/37 |
| 2,983,620 | 5/1961 | Haire | 501/148 |
| 3,148,169 | 9/1964 | Martens | 260/41 |
| 4,966,871 | 10/1990 | Brooks | 501/150 |

FOREIGN PATENT DOCUMENTS 346280  4/1972  U.S.S.R. ............................. 501/150

Primary Examiner—Mark L. Bell
Assistant Examiner—Deborah Jones

[57] ABSTRACT

A method for producing an attapulgite clay which retains its thixotropic properties, but does not release gases upon being compounded and cured in organic binder systems, such as plastisol, and the resultant low moisture thixotrope. The method involves (1) reducing the moisture content of the attapulgite by heating it under vacuum at an elevated temperature, preferably between 100° C. and 300° C., or (2) reducing the moisture content of the attapulgite by heating it at an elevated temperature, preferably between 100° C. and 350° C., and adding a silicone fluid, to preserve its thixotropic properties.

9 Claims, No Drawings

5,049,532

METHOD FOR SURFACE TREATING THIXOTROPIC AGENTS AND THE RESULTANT LOW MOISTURE THIXOTROPE

This application is a continuation-in-part of application Ser. No. 321,588 filed Mar. 10, 1989, now U.S. Pat. No. 4,966,871 issued Oct. 30, 1990.

TECHNICAL FIELD

This invention relates to thixotropic agents and more particularly, but not by way of limitation, to a method of producing attapulgite clays without destroying the thixotropic properties of the clays by reducing the moisture content to a level which permits the clay to be used as a thixotrope in plastisols, adhesive sealants, coatings and other organic binder systems which are heat set or heat cured.

BACKGROUND ART

The production of plastisols, adhesive sealants, coating and other organic binder systems which are heat set or heat cured requires the use of low moisture content thixotropic agents to achieve satisfactory film integrity. Thixotropic agents are used in the production of plastisols and adhesive sealants which are applied to metal or other materials, for example, the coatings found on the wire baskets in a dishwasher or refrigerator. The use of the thixotrope permits the uniform application of the plastisol film to the object which is to be coated and the retention of that relatively uniform film during curing. In heat set (i.e., plastics which cannot be reformed) and heat cured (i.e., plastics which may be reformed by reheating) applications, the moisture content of the plastisols must be low enough to prevent the excessive release of moisture upon heating. Excessive amounts of moisture released during heating can cause bubbles to form in the plastisol coating, which causes reduced film continuity (a coating which contains voids), localized areas where the film does not adhere to the surface coated, and a less desirable appearance.

Previously, the mineral asbestos processed by Johns-Manville Corporation, Union Carbide Corporation and others served as an effective thixotrope for plastisols, adhesive sealants, coatings and other organic binder systems. Thixotropic asbestos is processed to result in low moisture, typically less than 2% free moisture content. Asbestos had been considered a preferred cost effective thixotrope in these applications. Environmental and health considerations, as well as governmental regulations, limit its use and create a need for a suitable substitute thixotrope for use in heat set plastisol formulations and thermoplastic formulations.

Pyrogenic silica such as "CAB-O-SIL" by Cabot Corporation has been used as a substitute thixotrope for asbestos in plastisols, adhesive sealants, and other organic binder systems which are heat set or heat cured. The high cost of pyrogenic silica, however, creates an economic limitation on its use. Further, with time, pyrogenic silica is likely to absorb moisture, reducing its desirability as a thixotrope in, for example, plastisols.

Many clays, notably kaolinite clays, are used extensively as fillers in plastics. In such applications, the clays are used not as a thixotrope, but to achieve reduced shrinkage during curing, to obscure the fiber pattern of glass reinforcement and to increase resistance to chemical action and weathering.

The mineral, attapulgite, hydrated magnesium silicate clay, processed by Engelhard Company, the Floridin Company and others also serves as an effective thixotrope. Thixotropic attapulgite is widely used as a drilling mud in the drilling of oil wells. As commercially prepared, thixotropic attapulgite contains typically 10% to 15% moisture at 100° C. Undesirable quantities of the moisture contained in typically prepared thixotropic attapulgite is released when used as a thixotropic agent in plastisols, adhesive sealants and other organic binder systems which are heat set or heat cured. When typically prepared attapulgite is used in plastisols, for example, which are heat cured at about 100° C., the moisture in the attapulgite volatilizes and deforms the structure of the plastisol, reducing its film continuity. This moisture release limits or precludes the use of typical attapulgite as a thixotropic agent for most heat set or heat cured applications.

Thixotropic grade attapulgite is processed commercially in carefully controlled drying ovens. The literature teaches that drying temperatures above approximately 400° C. agglomerate the mineral particles and destroy the ability to disperse the clay in the form of colloidally active ultimate particles. The inventors do not know with certainty, but suspect that at this high temperature, refluxing of the water back into the clay structure is prevented, causing sintering of the attapulgite.

Bentonite clays treated with amine surfactants can become suitable thixotropic agents when the treated bentonite is mixed with an alcohol, water or other hydroxyl contributing agent by the user. However, bentonite so treated is not a suitable thixotrope for heat set or heat cured plastisols because of the excessive moisture content. Release of the moisture from the treated bentonite clays in heat set or heat cured plastisols results in an undesirable film having a deformed surface, reduced continuity, voids and localized areas of nonadhesion.

Thus, the present invention produces an economical and environmentally safe alternate to the principal thixotropic agent previously used, asbestos.

DISCLOSURE OF THE INVENTION

The present invention may be briefly described as a thixotropic grade attapulgite and methods for producing such attapulgite, that is suitable for use in plastisols, adhesive sealants, coatings and other organic binder systems which are heat set or heat cured. As disclosed in above cited application Ser. No. 321,588, now U.S. Pat. No. 4,966,871 one such method comprises drawing a vacuum on the attapulgite and heating it at a temperature sufficient to drive the free moisture from the attapulgite without destroying its thixotropic properties. The thixotropic agent is dried to a desired moisture content and then removed from the vacuum. We have now unexpectedly discovered yet another method to drive the free moisture from attapulgite without destroying its thixotropic properties. Such further method comprises drying the attapulgite below about 350° C. for a time sufficient to reduce the moisture content to the desired level, followed by intimately admixing this intermediate dried product with a silicone fluid.

The art of compounding plastics is well developed and covers a myriad of possible formulations. In general, a plastic resin, such as polyvinyl chloride, is compounded with plasticizers, fillers and stabilizers. The plastic resin may be one which is heat set or heat cured.

The selection of the plasticizer is governed by the properties desired in the final product. Properties commonly affecting plasticizer selection are thermal conductivity, electric conductivity, light stability, color stability, corrosion resistance, flame retardance and flexibility. Plasticizers include dioctyl phthalate, diisooctyl phthalate, diisodecyl phthalate, esters of carboxylic acids or phosphoric acid, polyglycols, ethers and sulfonamides. Stabilizers are used to inhibit degradation of the plastic by oxygen and ultra-violet radiation. Stabilizers include, for example: salicyclic acid, 2-hydroxy-benzophenone, lead salts, barium, cadmium, zinc and stearic acid. The strength, durability and color of plastics are varied by the incorporation of fillers such as pigments, clays and glass fibers. Thixotropic agents are added to plastisols and coatings in order to achieve the efficient and uniform application of plastic films during manufacture, for example, in the production of plastic coated wire baskets and shelves in home appliances.

The present invention has particular value in plastisols of the following general formula:

| Material | Parts by Weight |
| --- | --- |
| Polyvinyl chloride resin | 100 |
| Dioctyl phthalate | 45–100 |
| Epoxidized oil | 0–5 |
| Octyl epoxy stearate | 0–40 |
| Stabilizer | 1–5 |
| Filler | 0–100 |
| Stearic Acid | 0–2 |
| Thixotrope | 2–15 |

A preferred thixotropic agent produced by the present invention is attapulgite which has been dried to a desired moisture content and intimately admixed with silicone. In another embodiment of the invention the attapulgite is vacuum dried at elevated temperature. The structure of attapulgite, as explained in the literature, is thought to be represented by double silica chains running parallel to one another, with the chains linked together through oxygen atoms at their longitudinal edges to form a kind of double-ribbed sheet. The ribbed sheets are arranged so that the ribbed sheets point together, and the sheets are held together by aluminum and/or magnesium in octahedral coordination between apex oxygens of successive sheets, forming an amphibole chain. Chains of water molecules run parallel to the amphibole chains and fill the interstices between the chains. The cavities will accommodate 4 molecules of water per unit cell, and this zeolitic water (i.e., loosely held in the lattice) would account for the dehydration loss at low temperatures. Attapulgite exhibits a characteristic diffraction spacing of 10.48A which does not change with variations in relative humidity or moderate heating up to about 300° C. Differential thermal curves for attapulgite show an initial endothermic reaction below about 200° C. and additional endothermic reactions at about 225° C. to 350° C., which correspond approximately to the intervals of abrupt water losses shown by the dehydration curves. At 300° C. to 350° C., the ribbons of attapulgite take a tilted position. The original structure may be regained unless heating is continued because attapulgite rehydrates readily. At above 400° C., the fiber length contracts rapidly. This is explained by a closing of the cavities which leads to the disappearance of the water-absorbing property. Attapulgite dried above 400° C. exhibits no thixotropic properties.

Without wishing to be bound by any particular theory, it is believed that the invention functions by removing water from attapulgite without disrupting the amphibole chain structure, without losing absorption capacity and without altering thixotropic properties. It is known that when temperature alone is applied to drive off the water under normal atmospheric pressure, the results obtained are: (1) when heated below about 350° C., the water refluxes to the original site upon lowering the temperature or (2) when heated above about 350° C., the moisture content remains lowered and reflux is prevented. It is believed that this results from the collapse of the double-ribbed structure of attapulgite which occurs in the temperature range of 300° C. to 400° C. as described above. As a result, attapulgite cannot be dried under normal atmosphere to a moisture content which is compatible for use in plastisols without destruction of the structure which provides the thixotropic properties.

The inventors have found that the thixotropic properties of attapulgite can be preserved and reflux of significant quantities of moisture can be prevented by (1) drying attapulgite under a vacuum at temperatures in the range of about 100° C. to 300° C. or (2) drying the attapulgite by conventional (non-vacuum) methods at temperatures in the range of about 100° C. to 350° C. and then intimately admixing silicone in a mixer. The inventors would postulate that (1) the removal of all the zeolitic water without destruction of the double-ribbed structure or (2) the removal of a substantial amount of the zeolitic water and replacing this zeolitic water with silicone to fill the interstices between the chains of the above mentioned ribbed sheets prevents the destruction of the double-ribbed structure and that reflux is prevented by (1) removal of all the zeolitic water or (2) blocking the cavities with silicone.

DETAILED DESCRIPTION

The present invention is directed to, although not limited to, the use of thixotropic agents in the application of plastisols, adhesive sealants and coatings which are heat set. For these applications, attapulgite clay is the preferred thixotropic agent because it is readily available commercially, is economical, and produces a viscosity ratio approximating the previously used thixotropic asbestos. The inventors have found a very desirable thixotropic attapulgite and a plurality of methods for its production.

One method is to heat a commercially available thixotropic attapulgite having a moisture content between 10% and 15% in a vacuum between about 0.08 mm Hg and 0.8 mm Hg at a temperature between approximately 100° C. and 300° C. for a period sufficient to reduce the moisture content of the attapulgite to a desired level, typically below 5% moisture, measured by ASTM D-280-A. Another method is to heat a commercially available thixotropic attapulgite with a moisture content between 10% and 15% in a conventional (non-vacuum) oven at a temperature between approximately 100° C. and 350° C. for a period sufficient to reduce the moisture content of the attapulgite to a desired level, typically below 5% moisture, followed by intimately admixing with a silicone fluid in a mixer. The surface treatment of the thixotropic attapulgite in accordance with this latter method consists of the admixture of 0.1% to 10% by weight of a silicone fluid to the low moisture thixotropic attapulgite. This treatment preserves the thixotropic properties of attapulgite and prevents the reflux of significant quantities of moisture, so that the thixotrope may be shipped and stored in a conventional manner.

Silicone fluids, or organosilane, are well known and readily available on the open market and therefore will not be discussed in detail here. These compounds have a carbon to silicon linkage such as disclosed in Hyde U.S. Pat. No. 2,490,357 and Warrick U.S. Pat. No. 2,541,137. For the purposes of the present invention, the term "silicone fluid" is used to mean and include (1) the group of linear alkanylsilanes or alkenylsilanes, preferably of less than 250 molecular weight and having a viscosity at 25° C. of between 0.25 and 100 centistokes or (2) completely condensed cyclic organosiloxane derivatives, preferably of less than 12 silicone atoms per molecule and having a viscosity at 25° C. of between 0.25 and 100 centistokes. While silicone fluids generally are usable in this invention, a preferred silicone fluid is vinyl modified polydimethyl siloxane, i.e., a polydimethyl siloxane in which, typically, 1% to 25% of the methyl side groups have been replaced with vinyl groups. Another useful silicone fluid is octamethylcyclotetrasiloxane.

EXAMPLE

Plastisols having the following compositions were prepared:

TABLE

| Plastisol A | Parts by Wt. | Plastisol B | Parts by Wt. |
|---|---|---|---|
| Geon 121 | 100 | Geon 121 | 100 |
| Dioctyl Phthalate | 100 | Dioctyl Phthalate | 75 |
| Sympron 1489 | 4 | Paraplex G-62 | 5 |
| Gamasperse 80 | 100 | Nuostabe V-1788 | 3 |
| Thixotrope (attapulgite dried and admixed with 0.5% vinyl modified polydimethyl siloxane)* | 7 | Thixotrope (attapulgite dried and admixed with 0.5% octamethylcyclotetrasiloxane)** | 10 |

*Union Carbide Fluid A-1751, Union Carbide Corp.
**Dow Corning 244 Fluid, Dow Corning Corp.

Geon 121 is a trademark for polyvinyl chloride resin by B. F. Goodrich Company. Paraplex G-62 is a trademark for an epoxidized soy bean oil plasticizer by Rohm and Haas. Nuostabe V-1788 is a trademark for a metal soap stabilizer of barium, cadmium and zinc by Tenneco Chemical, Inc. Sympron 1489 is a trademark for a barium, cadmium, zinc and phosphate stabilizer. Gamasperse is a trademark of Georgia Marble for a calcium carbonate filler.

First, the thixotrope was prepared by placing typical thixotropic attapulgite clay in a standard drying oven at elevated temperatures between 100° C. and 350° C. for a period sufficient to reduce the moisture content to approximately 5%. The time required will vary depending upon quantities of the attapulgite, the size of the oven, etc., but in a typical laboratory oven of 3 ft$^3$, with about 10 pounds of attapulgite held at about 150° C., will be about one hour. The dried thixotropic attapulgite was removed from the oven and divided approximately into two aliquots. For the preparation of Plastisol A, 0.5% of Union Carbide Silicone Fluid A-1751 was added to one aliquot of the dried attapulgite identified immediately above and the mixture tumbled until the siloxane was uniformly dispersed. For the preparation of Plastisol B, 0.5% of Dow Corning 244 Fluid was added to the other aliquoit of dried attapulgite and tumbled until uniformly dispersed. The surface treated attapulgite samples were removed from the mixer and viscosity measurements were made at ambient temperature. A viscosity ratio of approximately 5 was obtained in each instance when the viscosity measured with a Brookfield Viscosimeter at 2 rpm was divided by the viscosity measured by the same instrument at 20 rpm. This ratio compared favorably to that of approximately 4 for thixotropic asbestos measured in the same manner. All samples of attapulgite prepared as described above retained their thixotropic character, and moisture did not reflux into the processed attapulgite after silicone treatment.

Conventional thixotropic attapulgite, prepared by placing the clay in a drying oven at temperatures between 100° C. and 350° C. for a period sufficient to reduce the moisture content to approximately 5%, but without silicone treatment, rehydrates to about 10 to 15% moisture content within a few hours, depending upon ambient humidity conditions.

In another method of producing the new low moisture thixotrope, a typical thixotropic attapulgite was placed in a vacuum at approximately 0.2 mm Hg and heated at a temperature between 100° C. and 300° C. for a time sufficient to reduce the moisture content to approximately 5%. Samples of attapulgite prepared in this way retained their thixoltropic character, and moisture did not reflux into the vacuum processed attapulgite after removal from the vacuum chamber. The thixotropic attapulgite prepared according to either of the above described methods was then mixed with the other components of plastisols A and B. All compositions adhered well when applied to metal and produced satisfactory films when cured. None of the films exhibited discontinuities or bubbles.

Samples of plastisols A and B were prepared using normal thixotropic attapulgite with a moisture content of approximately 12%. All of these samples resulted in undesirable films having visibly observable bubbles in the films.

While rather specific terms have been used to describe two embodiments of the present invention, they are not intended nor should they be construed as a limitation upon the invention as defined by the following claims:

We claim:

1. A thixotropic attapulgite having a moisture content of from about 2% to about 5%.

2. A thixotropic attapulgite as defined in claim 1, which includes about 0.1 to about 10% of a silicone fluid.

3. The thixotrope of claim 2 wherein the quantity of silicone fluid is about 0.5%.

4. The thixotrope of claim 2 wherein the silicone is vinyl modified polydimethyl siloxane.

5. The thixotrope of claim 2 wherein the silicone is octamethylcyclotetrasiloxane.

6. A method for producing a thixotropic attapulgite which comprises the steps of: (1) heating thixotropic attapulgite at a temperature of between about 100° C. and about 350° C. for a time sufficient to reduce the moisture content of the attapulgite to from about 2% to about 5% and (2) intimately admixing the product of step 1 with about 0.1% to 10% of a silicone fluid.

7. The method of claim 6 wherein the quantity of silicone fluid is about 0.5%.

8. The method of claim 6 wherein the silicone is vinyl modified polydimethyl siloxane.

9. The Method of claim 6 wherein the silicone is octamethylcyclotetrasiloxane.

* * * * *